(12) United States Patent
Umemoto

(10) Patent No.: US 10,487,713 B2
(45) Date of Patent: Nov. 26, 2019

(54) EXHAUST GAS PURIFICATION APPARATUS FOR INTERNAL COMBUSTION ENGINE

(71) Applicant: TOYOTA JIDOSHA KABUSHIKI KAISHA, Aichi-ken (JP)

(72) Inventor: Kazuhiro Umemoto, Ebina (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/290,793

(22) Filed: Mar. 1, 2019

(65) Prior Publication Data

US 2019/0271248 A1    Sep. 5, 2019

(30) Foreign Application Priority Data

Mar. 2, 2018    (JP) ................................ 2018-037556

(51) Int. Cl.
*F01N 3/20*  (2006.01)
*B01D 53/94*  (2006.01)
*F01N 3/10*  (2006.01)

(52) U.S. Cl.
CPC ......... *F01N 3/208* (2013.01); *B01D 53/9431* (2013.01); *B01D 53/9495* (2013.01); *F01N 3/106* (2013.01); *F01N 2610/02* (2013.01); *F01N 2610/04* (2013.01); *F01N 2900/1404* (2013.01); *F01N 2900/1621* (2013.01)

(58) Field of Classification Search
None
See application file for complete search history.

(56) References Cited

U.S. PATENT DOCUMENTS

2017/0051647 A1    2/2017    Iida et al.

FOREIGN PATENT DOCUMENTS

| JP | 2015-101968 A | | 6/2015 |
|---|---|---|---|
| JP | 2015101968 A | * | 6/2015 |
| RU | 2645101 C1 | | 2/2018 |

OTHER PUBLICATIONS

Kazuki, I. JP2015-101968A—translated document (Year: 2015).*

* cited by examiner

*Primary Examiner* — Jelitza M Perez
(74) *Attorney, Agent, or Firm* — Hauptman Ham, LLP

(57) ABSTRACT

The exhaust gas purification apparatus is applied to an internal combustion engine. The exhaust gas purification apparatus includes a SCR catalyst, a reducing agent addition valve, an oxidation catalyst, a fuel addition valve, and a controller. The controller is configured to add fuel into the exhaust gas through the fuel addition valve, in a case where the reducing agent is added to the exhaust gas through the reducing agent addition valve in a state where the temperature of the SCR catalyst is higher than a predetermined threshold value. The controller is further configured to control the fuel addition valve so that the amount of fuel added through the fuel addition valve is smaller in a case where the degree of deterioration of the SCR catalyst is smaller than in a case where the degree of deterioration is larger.

2 Claims, 6 Drawing Sheets

[Fig. 1]
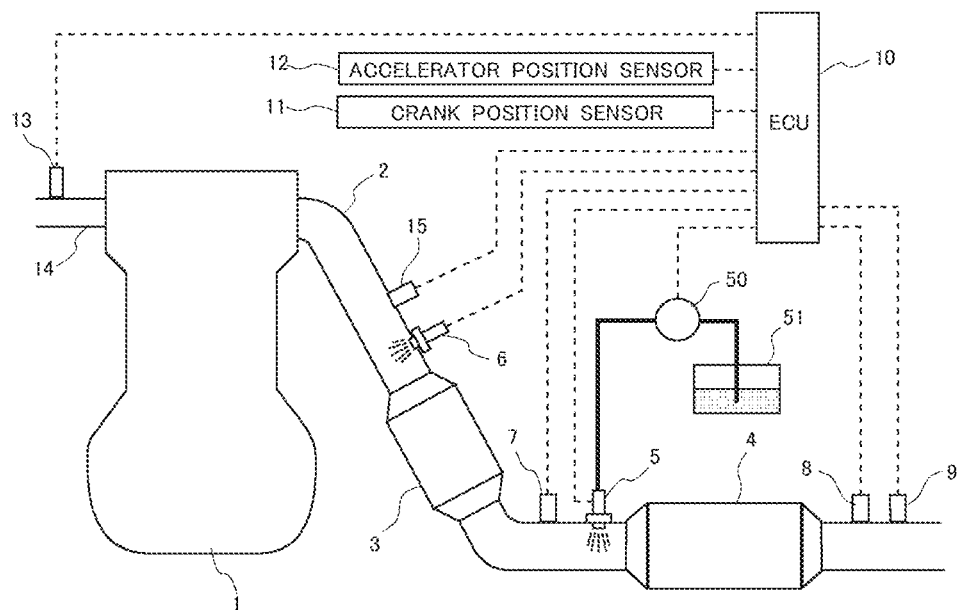
[Fig. 2]
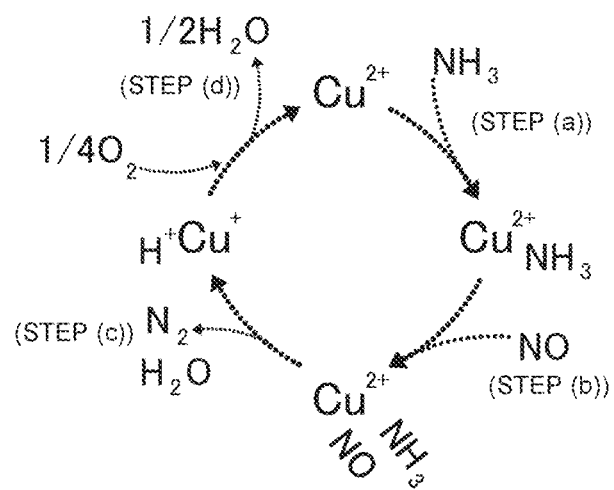

[Fig. 3]
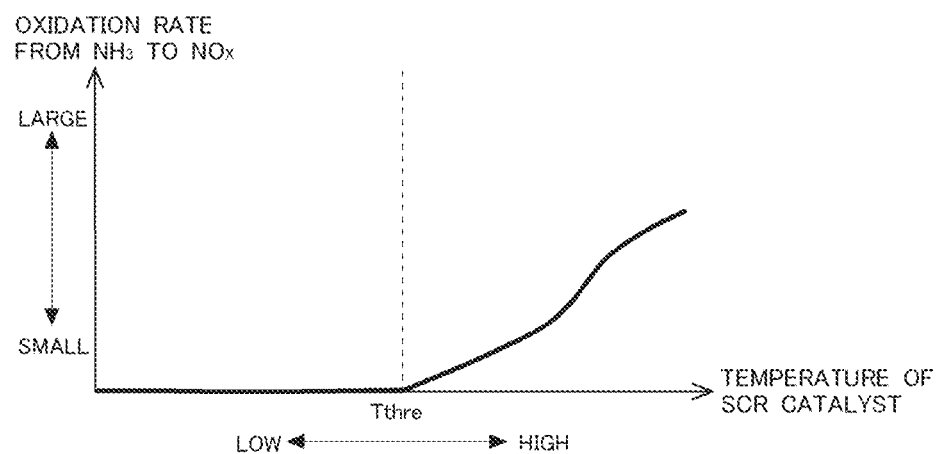
[Fig. 4]
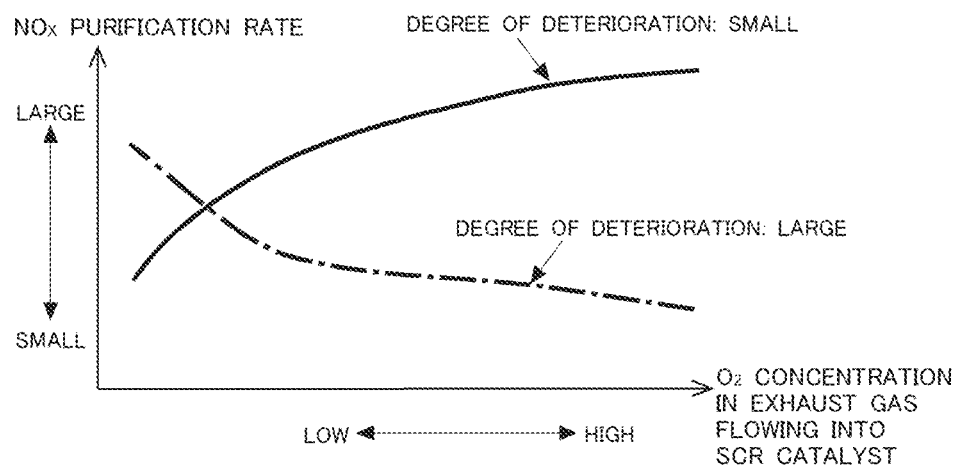

[Fig. 5]
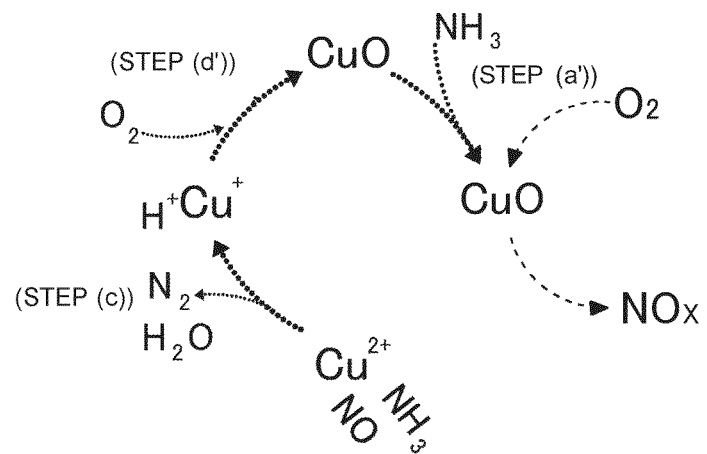
[Fig. 6]
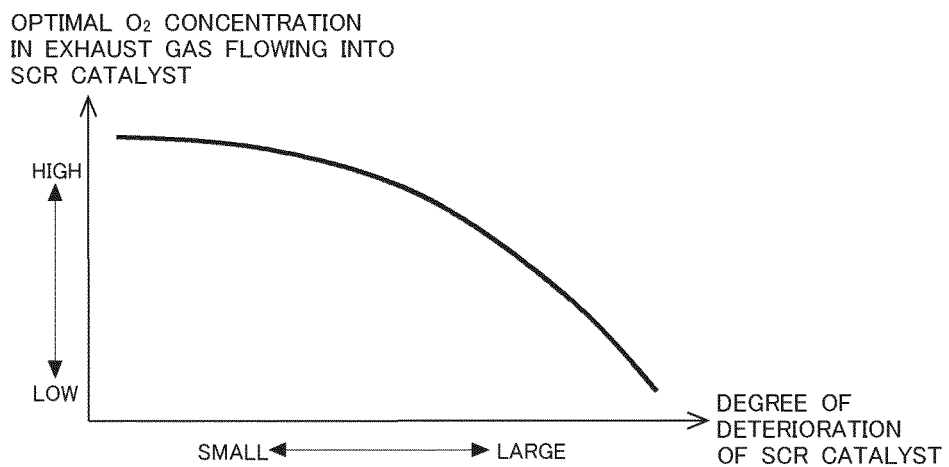

[Fig. 7]
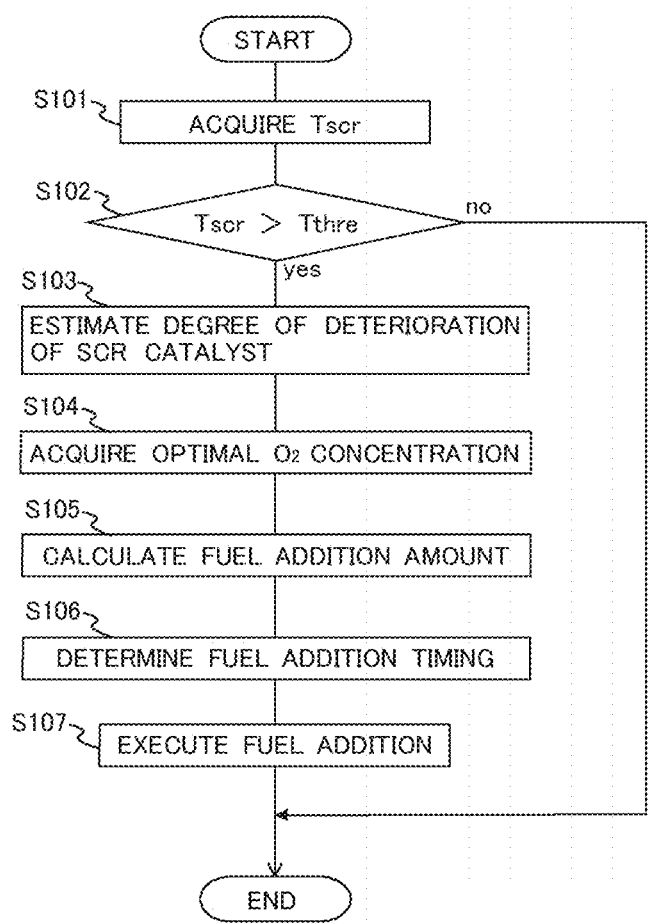

[Fig. 8]
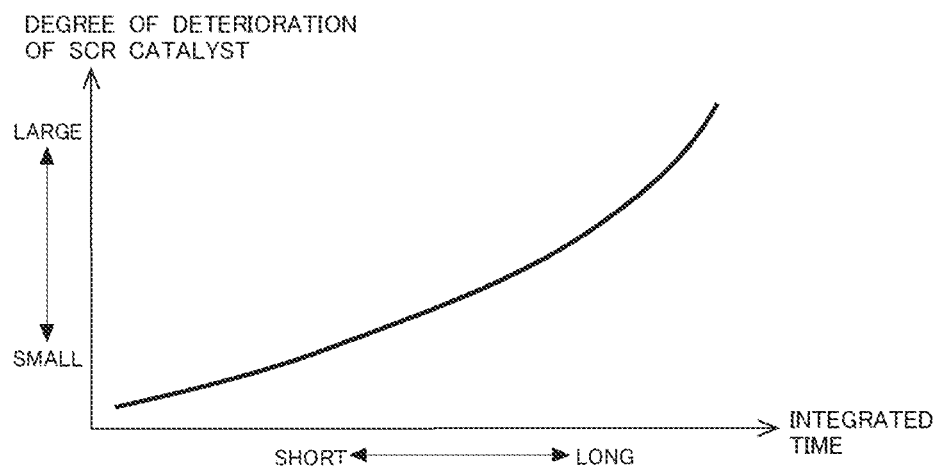
[Fig. 9]
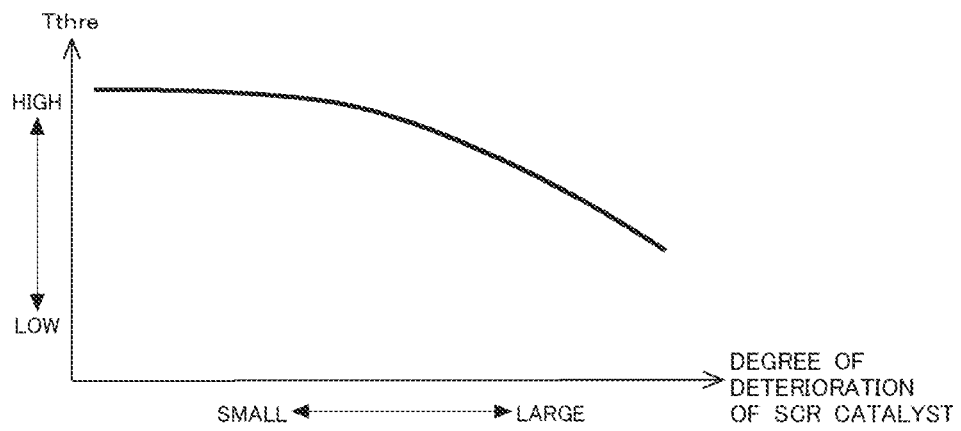

[Fig. 10]
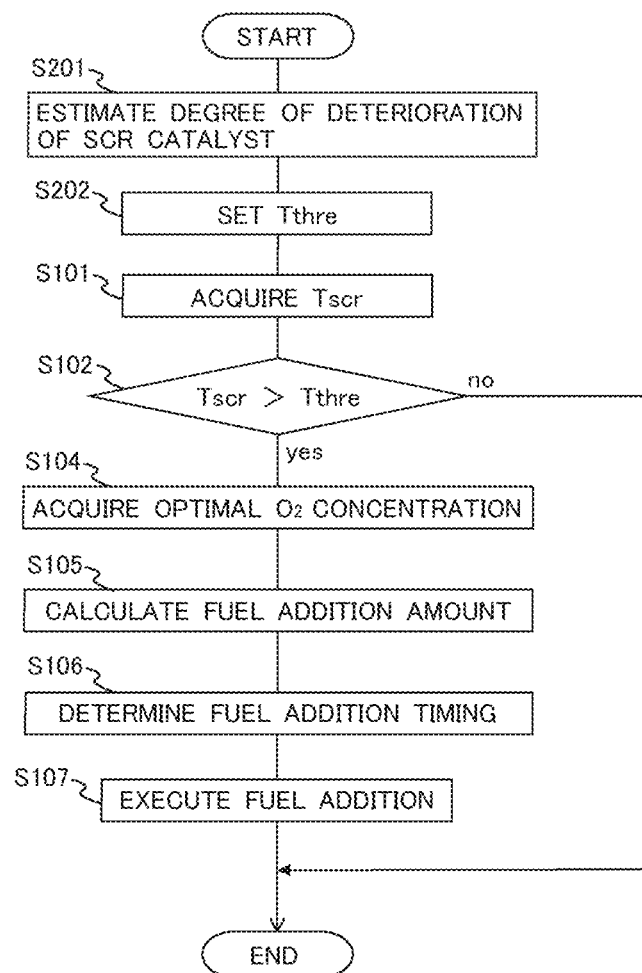

EXHAUST GAS PURIFICATION APPARATUS FOR INTERNAL COMBUSTION ENGINE

CROSS-REFERENCE TO RELATED APPLICATIONS

This application claims the benefit of Japanese Patent Application No. 2018-037556, filed on Mar. 2, 2018 which are hereby incorporated by reference herein in its entirety.

BACKGROUND

Technical Field

The present disclosure relates to an exhaust gas purification apparatus for an internal combustion engine, and more particularly to an exhaust gas purification apparatus provided with a selective catalytic reduction (SCR) catalyst.

Description of the Related Art

Devices provided with a SCR catalyst disposed in an exhaust passage, and with a reducing agent addition valve through which a reducing agent such as $NH_3$ or precursor of $NH_3$ is added to exhaust gas flowing into the SCR catalyst, are well known as exhaust gas purification apparatuses in internal combustion engines with lean burn operation. In such exhaust gas purification apparatuses for internal combustion engines, a reducing agent is added as appropriate, through the reducing agent addition valve when the internal combustion engine is in lean burn operation (i.e. when the atmospheric air-fuel ratio of the exhaust gas discharged from the internal combustion engine is a lean air-fuel ratio that is leaner than a theoretical air-fuel ratio); as a result, the SCR catalyst can reduce $NO_X$ in the exhaust gas to $N_2$ and $H_2O$ using $NH_3$ derived from the reducing agent. When the temperature of the SCR catalyst exceeds a predetermined threshold value higher than an activation temperature, however, the $NH_3$ in the SCR catalyst reacts readily with $O_2$ in the exhaust gas, which may result in generation of $NO_X$ derived from $NH_3$. Technologies proposed to tackle this problem include providing an oxidation catalyst disposed upstream of the SCR catalyst and a fuel addition valve disposed upstream of the oxidation catalyst, and adding fuel through the fuel addition valve in a case where the reducing agent is to be added through the reducing agent addition valve in a state where the temperature of the SCR catalyst is higher than a predetermined threshold value, to thereby reduce $O_2$ concentration in the exhaust gas flowing into the SCR catalyst (for example, see patent literature 1).

CITATION LIST

Patent Literature

Patent Literature 1: Japanese Patent Application Laid-Open No. 2015-101968

SUMMARY

The $NO_X$ reducing action in the SCR catalyst is brought about by the working of transition metal ions (for instance copper (Cu) ions and iron (Fe) ions) supported on a catalyst carrier of the SCR catalyst. In further detail, the transition metal ions adsorb $NH_3$ derived from the reducing agent. If the ionic valence of the transition metal ions having $NH_3$ adsorbed thereon is the valence necessary for $NO_X$ reduction (such a state may also be referred to hereafter as "reference state"), the transition metal ions elicit reactions of $NH_3$ and $NO_X$ in the exhaust gas, as a result of which the $NO_X$ in the exhaust gas can be reduced to $N_2$. The ionic valence of the transition metal ions becomes then lower than the valence necessary for $NO_X$ reduction, and accordingly the $NO_X$ reducing ability of the transition metal ions decreases (such a state may also be referred to hereafter as "lower state"). However, $H^+$ adsorbs on the transition metal ions in the lower state during the reaction of $NH_3$ and $NO_X$. The transition metal ions become re-oxidized upon reaction of $H^+$, adsorbed on the transition metal ions in the lower state, with $O_2$ or $NO_2$ in the exhaust gas, and the ionic valence of the transition metal ions recovers thereby (hereafter this may also be referred to as "valence recovery") back to the ionic valence necessary for $NO_X$ reduction.

When the SCR catalyst is exposed to an atmosphere at a temperature higher than the above predetermined threshold value, there is a chance of deterioration of the $NO_X$ purification performance of the SCR catalyst due to oxidation of the transition metal ions in the SCR catalyst. In the case of deterioration of the SCR catalyst, $NO_X$ is generated readily as a result of a reaction between $O_2$ in the exhaust gas and $NH_3$ derived from a reducing agent, mediated through the action of an oxide (for instance CuO or FeO) of the transition metal ions, when the reducing agent is added through the reducing agent addition valve in a state where the temperature of the SCR catalyst is higher than a predetermined threshold value. An increase in the generation amount of $NO_X$ derived from $NH_3$ translates into an increase of also the amount of $NO_X$ flowing out of the SCR catalyst, and thus the $NO_X$ purification rate of the SCR catalyst ((((inflow $NO_X$ amount)−(outflow $NO_X$ amount))/(inflow $NO_X$ amount)) may decrease as a result.

By contrast, the amount of $O_2$ contributing to oxidation of $NH_3$ can be reduced when the $O_2$ concentration in the exhaust gas flowing into the SCR catalyst is lowered through addition of fuel through the fuel addition valve, at the time of addition of the reducing agent through the reducing agent addition valve in a state where the temperature of the SCR catalyst is higher than a predetermined threshold value, as in the above-described conventional art. As a result, it becomes possible to reduce the generation amount of $NO_X$ derived from $NH_3$. In a case however where the degree of deterioration of the SCR catalyst is comparatively small (in a case where the amount of oxide of transition metal ions is comparatively small), the concentration of $O_2$ in the exhaust gas flowing into the SCR catalyst becomes excessively low upon addition of a comparatively large amount of fuel through the fuel addition valve at the time of addition of the reducing agent through the reducing agent addition valve in a state where the temperature of the SCR catalyst is higher than a predetermined threshold value. As a result, this may give rise to an insufficient amount of $O_2$ contributing to re-oxidation (valence recovery) of transition metal ions having descended to the lower state. In consequence, the $NO_X$ purification rate of the SCR catalyst might rather drop when the amount of transition metal ions in the reference state decreases (in other words, when the amount of transition metal ions in the lower state increases).

It is an object of the present disclosure, arrived at in view of the above considerations, to provide a technology that allows raising the $NO_X$ purification rate of a SCR catalyst as much as possible when the temperature of the SCR catalyst is high, in an exhaust gas purification apparatus, of an internal combustion engine, provided with a SCR catalyst, a reducing agent addition valve, an oxidation catalyst and a fuel addition valve.

In order to solve the above problems, the present disclosure is an exhaust gas purification apparatus for an internal combustion engine, in which fuel addition through a fuel addition valve is also carried out in a case where a reducing agent is added through a reducing agent addition valve in a state where the temperature of a SCR catalyst is higher than a predetermined threshold value, wherein the amount of fuel that is added through the fuel addition valve is set to be smaller in a case where the degree of deterioration of the SCR catalyst is smaller than in a case where the degree of deterioration of the SCR catalyst is larger.

In further detail, the present disclosure is an exhaust gas purification apparatus for an internal combustion engine, provided with: a selective catalytic reduction catalyst (SCR catalyst) disposed in an exhaust passage of the internal combustion engine, and equipped with transition metal ions for reducing $NO_X$ in exhaust gas by using $NH_3$ as a reducing agent; a reducing agent addition valve disposed in the exhaust passage, upstream of the SCR catalyst, for adding a reducing agent, which is $NH_3$ or a precursor of $NH_3$, into the exhaust gas; an oxidation catalyst disposed in the exhaust passage, upstream of the reducing agent addition valve; a fuel addition valve disposed in the exhaust passage, upstream of the oxidation catalyst, for adding fuel into the exhaust gas; and a controller comprising at least one processor, and configured to add fuel into the exhaust gas through the fuel addition valve, in a case where the reducing agent is added to the exhaust gas through the reducing agent addition valve in a state where the temperature of SCR catalyst is higher than a predetermined threshold value. The controller is further configured to: estimate a degree of deterioration of the SCR catalyst; and control the fuel addition valve so that the amount of fuel added through the fuel addition valve is smaller in a case where the degree of deterioration of the SCR catalyst is smaller than in a case where the degree of deterioration is larger. The term "predetermined threshold value" denotes herein a temperature estimated as enabling generation of $NO_X$ derived from oxidation of $NH_3$, when the temperature of the SCR catalyst exceeds a predetermined threshold value, the predetermined threshold value being higher than the temperature (activation temperature) at which $NO_X$ reduction by transition metal ions in the reference state begins to occur.

In the above-described exhaust gas purification apparatus for an internal combustion engine, a reducing agent is added into the exhaust gas through the reducing agent addition valve in a state where temperature of the SCR catalyst is higher than a predetermined threshold value, the fuel added into the exhaust gas through the fuel addition valve becomes oxidized in the oxidation catalyst. As a result, part of the $O_2$ contained in the exhaust gas is consumed in oxidation reactions of the added fuel, and accordingly the $O_2$ concentration in the exhaust gas flowing out of the oxidation catalyst (exhaust gas flowing into the SCR catalyst) decreases. In the exhaust gas purification apparatus for an internal combustion engine according to the present disclosure, the amount of fuel added through the fuel addition valve is smaller in a case where the degree of deterioration of the SCR catalyst is smaller than in a case where the degree of deterioration is larger, and as a result, the degree of ensuing decrease in the $O_2$ concentration of the exhaust gas flowing into the SCR catalyst is smaller.

Purification of $NO_X$ by the SCR catalyst is accomplished herein through the action of the transition metal ions (for instance copper (Cu) and iron (Fe) ions) supported on the SCR catalyst, as described above. When these transition metal ions are exposed to a high-temperature atmosphere, the transition metal ions may become oxidized by reacting with $O_2$ in the exhaust gas. Once the transition metal ions are oxidized, the resulting oxide (for instance CuO or FeO) does not revert to transition metal ions, and the $NO_X$ purification performance of the SCR catalyst deteriorates as a result. In the case of deterioration of the SCR catalyst, $O_2$ in the exhaust gas and $NH_3$ derived from the reducing agent react through the action of the oxide of the transition metal ions, and $NO_X$ derived from $NH_3$ is generated readily, upon addition of the reducing agent through the reducing agent addition valve in a state where the temperature of the SCR catalyst is higher than a predetermined threshold value. However, the amount of oxide of transition metal ions is small in a case where the degree of deterioration of the SCR catalyst is comparatively small, and hence a re-oxidation reaction of the transition metal ions having descended to the lower state predominates over the oxidation reactions from $NH_3$ to $NO_X$. Accordingly, in a case where the degree of deterioration of the SCR catalyst is comparatively small, the $O_2$ concentration in the exhaust gas flowing into the SCR catalyst is high when the amount of fuel added through the fuel addition valve is set to be small at the time of addition of reducing agent through the reducing agent addition valve in a state where the temperature of the SCR catalyst is higher than a predetermined threshold value, and accordingly it becomes possible to secure $O_2$ contributing to re-oxidation (valence recovery) of the transition metal ions having descended to the lower state. In consequence, valence recovery of the transition metal ions having descended to the lower state can take place effectively. As a result, this allows for continuous $NO_X$ reduction by the SCR catalyst. If on the other hand the degree of deterioration of the SCR catalyst is comparatively large, the amount of oxide of transition metal ions is large, and therefore oxidation reactions from $NH_3$ to $NO_X$ predominate over the re-oxidation reaction of the transition metal ions having descended to the lower state. Accordingly, the amount of $O_2$ contributing to oxidation reactions from $NH_3$ to $NO_X$ can be reduced, in a case where the degree of deterioration of the SCR catalyst is comparatively large, since the $O_2$ concentration in the exhaust gas flowing into the SCR catalyst drops when there is set a large amount of fuel added through the fuel addition valve, at the time of addition of reducing agent through the reducing agent addition valve in a state where the temperature of the SCR catalyst is higher than a predetermined threshold value. As a result, it becomes possible to reduce the generation amount of $NO_X$ derived from $NH_3$.

Therefore, the increase in the amount of $NO_X$ flowing out of the SCR catalyst when the amount of fuel added through the fuel addition valve is reduced, at the time of addition of the reducing agent into the exhaust gas through the reducing agent addition valve in a state where the temperature of the SCR catalyst is higher than a predetermined threshold value, can be suppressed to a greater extent in a case where the degree of deterioration of the SCR catalyst is smaller than in a case where the degree of deterioration is larger. As a result, it becomes possible to raise as much as possible the $NO_X$ purification rate of the SCR catalyst, in cases where the temperature of the SCR catalyst is higher than a predetermined threshold value.

The controller according to the present disclosure may be further configured to set the predetermined threshold value to a lower temperature in a case where the degree of deterioration of the SCR catalyst is larger than in a case where the degree of deterioration is smaller. That is because oxidation reactions from $NH_3$ to $NO_X$ elicited through the action of the oxide of the SCR transition metal ions occurs more readily, also at a lower temperature region, by virtue of the fact that the amount of the oxide is greater in a case where the degree of deterioration of the SCR catalyst is larger than in a case where the degree of deterioration is smaller. As a result, oxidation reactions from $NH_3$ to $NO_X$ elicited through the action of the oxide can be suppressed yet more reliably, also in a case where the degree of deterioration of the SCR catalyst is comparatively large.

The controller according to the present disclosure may estimate the degree of deterioration of the SCR catalyst on the basis of a history of the temperature to which the SCR catalyst has been exposed. The longer the period over which the SCR catalyst is exposed to a temperature at or above a predetermined deterioration start temperature (for instance about 750° C.), the more readily the degree of deterioration of the SCR catalyst increases (i.e. the more readily the amount of oxide of transition metal ions increases). Accordingly, the degree of deterioration of the SCR catalyst can be grasped with good precision if estimated on the basis of the history of the temperature to which the SCR catalyst has been exposed.

The present disclosure allows raising the $NO_X$ purification rate of a SCR catalyst as much as possible when the temperature of the SCR catalyst is high, in an exhaust gas purification apparatus, of an internal combustion engine, provided with a SCR catalyst, a reducing agent addition valve, an oxidation catalyst and a fuel addition valve.

BRIEF DESCRIPTION OF DRAWINGS

FIG. 1 is a diagram illustrating the schematic configuration of an internal combustion engine in which the present disclosure is utilized, and of an intake and exhaust system of the internal combustion engine;

FIG. 2 is a diagram illustrating schematically $NO_X$ reduction reactions in a SCR catalyst;

FIG. 3 is a diagram illustrating a correlation between temperature of a SCR catalyst and oxidation rate from $NH_3$ to $NO_X$ in the SCR catalyst;

FIG. 4 is a diagram illustrating schematically a correlation between $O_2$ concentration in exhaust gas flowing into a SCR catalyst and $NO_X$ purification rate of the SCR catalyst, in a case where the temperature of the SCR catalyst is higher than a predetermined threshold value;

FIG. 5 is a diagram illustrating schematically oxidation reactions of $NH_3$ in the case of a deteriorated SCR catalyst;

FIG. 6 is a diagram illustrating a correlation between a degree of deterioration of a SCR catalyst and optimal $O_2$ concentration of exhaust gas flowing into the SCR catalyst;

FIG. 7 is a flowchart illustrating a processing routine that is executed by an ECU during execution of $NH_3$ oxidation suppression control;

FIG. 8 is a diagram illustrating a correlation between a degree of deterioration of a SCR catalyst and a predetermined threshold value;

FIG. 9 is a diagram illustrating a correlation between a degree of deterioration of a SCR catalyst and a predetermined threshold value (Tthre), in another example; and FIG. 10 is a flowchart illustrating a processing routine that is executed by an ECU during execution of $NH_3$ oxidation suppression control, in another example.

DESCRIPTION OF EMBODIMENTS

Concrete embodiments of the present disclosure will be explained hereafter with reference to accompanying drawings. Unless otherwise noted, the dimensions, materials, shapes, relative arrangement and so forth of the constituent components described in the embodiments are not meant to limit the technical scope of the disclosure to these features alone.

FIG. 1 is a diagram illustrating the schematic configuration of an internal combustion engine, and an intake and exhaust system thereof, in which an exhaust gas purification apparatus according to the present disclosure is utilized. An internal combustion engine 1 illustrated in FIG. 1 is an internal combustion engine (diesel engine) of compression ignition type and that utilizes diesel oil as fuel. The internal combustion engine 1 may also be an internal combustion engine of spark ignition type (gasoline engine) allowing for lean burn operation.

An exhaust passage 2 for allowing burned gas (exhaust gas) discharged from inside cylinders to flow is connected to the internal combustion engine 1. A first catalyst casing 3 is disposed halfway in the exhaust passage 2. A second catalyst casing 4 is disposed in the exhaust passage 2, downstream of the first catalyst casing 3.

The first catalyst casing 3 accommodates a catalyst carrier supporting an oxidation catalyst, and a particulate filter, inside a tubular casing. The particulate filter traps particulate matter (PM) contained in the exhaust gas. A fuel addition valve 6 for addition (injection) of fuel into the exhaust gas is disposed in the exhaust passage 2, upstream of the first catalyst casing 3.

The second catalyst casing 4 accommodates a catalyst carrier supporting a SCR catalyst, inside a tubular casing. The catalyst carrier results for instance from coating a monolith-type substrate, having a honeycomb-shaped cross-section, with an alumina-based or zeolite-based catalyst carrier. On the catalyst carrier there are supported, through ion exchange, for instance Cu or Fe, which are transition metal elements. The SCR catalyst thus configured adsorbs $NH_3$ contained in the exhaust gas, and reduces $NO_X$ in the exhaust gas to $N_2$ using the adsorbed $NH_3$ as a reducing agent. In the present embodiment copper ions are used as the transition metal ions supported on the catalyst carrier of the SCR catalyst.

A reducing agent addition valve 5 for adding (injecting) a reducing agent, which is $NH_3$ or a precursor of $NH_3$, into the exhaust gas is disposed in the exhaust passage 2, between the first catalyst casing 3 and the second catalyst casing 4. The reducing agent addition valve 5 is connected to a reducing agent tank 51 via a pump 50. The pump 50 sucks the reducing agent stored in the reducing agent tank 51 and pumps the suctioned reducing agent towards the reducing agent addition valve 5. The reducing agent addition valve 5 injects the reducing agent, pumped by the pump 50, into the exhaust passage 2. Herein $NH_3$ gas or an aqueous solution of for instance urea or ammonium carbamate can be used as the reducing agent stored in the reducing agent tank 51; in the present embodiment there is used an aqueous urea solution.

When an aqueous urea solution is injected through the reducing agent addition valve 5, the aqueous urea solution flows into the second catalyst casing 4 together with the exhaust gas. The aqueous urea solution decomposes then on account of the heat of the exhaust gas, or is hydrolyzed by the SCR catalyst. Thermal decomposition or hydrolysis of the aqueous urea solution gives rise to $NH_3$. The $NH_3$ thus generated becomes adsorbed onto the SCR catalyst. The $NH_3$ adsorbed onto the SCR catalyst reacts with $NO_X$ contained in the exhaust gas, giving rise to $N_2$ and $H_2O$.

An ancillary ECU 10 is provided in the internal combustion engine 1 thus configured. The ECU 10 is an electronic control unit equipped with a CPU, a ROM, a RAM, a backup RAM and the like. Various sensors such as a first $NO_X$ sensor 7, a second $NO_X$ sensor 8, an exhaust gas temperature sensor 9, a crank position sensor 11, an accelerator position sensor 12, an air flow meter 13 and an air-fuel ratio sensor 15 are electrically connected to the ECU 10.

The first $NO_X$ sensor 7 is disposed in the exhaust passage 2 between the first catalyst casing 3 and the second catalyst casing 4, and outputs an electrical signal correlated to the $NO_X$ concentration in the exhaust gas flowing into the second catalyst casing 4. The second $NO_X$ sensor 8 is disposed in the exhaust passage 2 downstream of the second catalyst casing 4, and outputs an electrical signal correlated to the $NO_X$ concentration in the exhaust gas flowing out of the second catalyst casing 4. The exhaust gas temperature sensor 9 is disposed in the exhaust passage 2 downstream of the second catalyst casing 4, and outputs an electrical signal correlated to the temperature of the exhaust gas flowing out of the second catalyst casing 4. The crank position sensor 11 outputs an electrical signal correlated to the rotational position of an output shaft (crankshaft) of the internal combustion engine 1. The accelerator position sensor 12 outputs an electrical signal correlated to the operation amount of an accelerator pedal (accelerator opening). The air flow meter 13 is disposed in an intake passage 14 of the internal combustion engine 1, and outputs an electrical signal correlated to the amount (mass) of air taken into the internal combustion engine 1. The air-fuel ratio sensor 15 is disposed in the exhaust passage 2, upstream of the fuel addition valve 6, and outputs an electrical signal correlated to the air-fuel ratio the exhaust gas.

The ECU 10 is electrically connected to various devices (for instance fuel injection valve and so forth) that are attached to the internal combustion engine 1, and also to the abovementioned reducing agent addition valve 5, fuel addition valve 6, pump 50 and so forth. The ECU 10 electrically controls, on the basis of the output signals of the various sensors above, for instance the various devices of the internal combustion engine 1, as well as the reducing agent addition valve 5, fuel addition valve 6, pump 50 and so forth. For instance the ECU 10 executes known controls such as fuel injection control of controlling the injection amount and/or injection timing at a fuel injection valve in accordance with engine load and engine rotational speed of the internal combustion engine 1, addition control of injecting a reducing agent intermittently through the reducing agent addition valve 5, and filter regeneration control of adding fuel through the fuel addition valve 6, in order to oxidize and remove PM trapped in the particulate filter, and performs moreover $NH_3$ oxidation suppression control for suppressing oxidation reactions from $NH_3$ to $NO_X$ in the SCR catalyst, through fuel addition by the fuel addition valve 6, in a case where the reducing agent is to be added through the reducing agent addition valve 5 in a state where the temperature of the SCR catalyst is higher than a predetermined threshold value. An explanation follows next on $NH_3$ oxidation suppression control in the present embodiment.

($NH_3$ Oxidation Suppression Control)

Firstly, $NO_X$ reduction reactions in the SCR catalyst will be explained on the basis of FIG. 2. FIG. 2 is a diagram illustrating schematically the above $NO_X$ reduction reactions, for the purpose of explaining those reactions. The $NO_X$ reduction reactions in the SCR catalyst take place on copper ions supported on the catalyst carrier. This can be conceivably divided schematically into four steps (a) to (d). In step (a), first, $NH_3$ derived from the reducing agent that is added through the reducing agent addition valve 5 becomes adsorbed on copper ions ($Cu^{2+}$) in a state (reference state) in which ionic valence is the valence (2+) necessary for $NO_X$ reduction. In step (b) next, $NO_X$ (NO) becomes adsorbed on the copper ions. As a result, $NH_3$ and NO react in step (c), giving rise to $N_2$ and $H_2O$, and the ionic valence of the copper ions drops from the valence (2+) necessary for $NO_X$ reduction down to a lower valence (1+). The $NO_X$ reducing ability of the copper ions decreases (lower state) when the ionic valence of the copper ions drops to 1+. A state is however brought about in which hydrogen ions $H^+$ generated in step (c) become adsorbed on the copper ions ($Cu^+$) in the lower state. In step (d), the copper ions ($Cu^+$) in the lower state become re-oxidized when oxygen ($¼O_2$) or $NO_2$ is supplied to the copper ions ($Cu^+$) in that state. Upon re-oxidation of the copper ions ($Cu^+$) in the lower state, the ionic valence of the copper ion reverts (valence recovery) to the valence (2+) necessary for $NO_X$ reduction. As a result, the reactions can sequentially continue from step (a), thereby enabling continuous $NO_X$ reduction by the SCR catalyst.

When the temperature of the SCR catalyst exceeds a predetermined threshold value (Tthre) higher than the activation temperature (temperature at which $NO_X$ reduction by the transition metal ions in the reference state begins to occur) the reaction between $NH_3$ and $O_2$ ($NH_3+O_2 \rightarrow NO_X+H_2O$) becomes dominant over the reactions between $NH_3$ and $NO_X$ in the SCR catalyst, and as a result there are manifested oxidation reactions from $NH_3$ to $NO_X$, as illustrated in FIG. 3. A method for adding fuel through the fuel addition valve 6 is effective, at the time of addition of a reducing agent through the reducing agent addition valve 5, to suppress such oxidation reactions from $NH_3$ to $NO_X$. That is, when fuel is added through the fuel addition valve 6 at the time of addition of a reducing agent through the reducing agent addition valve 5, the fuel added through the fuel addition valve 6 reacts with $O_2$ in the exhaust gas, at the oxidation catalyst of the first catalyst casing 3, and the fuel becomes oxidized as a result. In consequence part of the $O_2$ contained in the exhaust gas is consumed in oxidizing the added fuel, and accordingly the $O_2$ concentration in the exhaust gas flowing out of the first catalyst casing 3 (exhaust gas flowing into the second catalyst casing 4) decreases. Therefore, the $O_2$ amount contributing of the oxidation of $NH_3$ in the SCR catalyst of the second catalyst casing 4 decreases, and the generation amount of $NO_X$ derived from $NH_3$ can be reduced.

However, a concern may arise that the $NO_X$ purification rate of the SCR catalyst (((inflow $NO_X$ amount)−(outflow $NO_X$ amount))/(inflow $NO_X$ amount)) rather drops in a case where the amount of fuel added through the fuel addition valve 6, at the time of addition of the reducing agent through the reducing agent addition valve 5 in a state where the temperature of the SCR catalyst exceeds the predetermined threshold value (Tthre), is determined without taking into consideration the degree of deterioration of the SCR catalyst. FIG. 4 is a diagram illustrating correlations between the $O_2$ concentration in exhaust gas flowing into the SCR catalyst and the $NO_X$ purification rate of the SCR catalyst in a case where reducing agent is added through the reducing agent addition valve 5 in a state where the temperature of the SCR catalyst exceeds the predetermined threshold value (Tthre). The solid line in FIG. 4 denotes a correlation in a case where the degree of deterioration of the SCR catalyst is comparatively small, while the dashed line in FIG. 4 denotes a correlation in a case where the degree of deterioration of the SCR catalyst is comparatively large. If the degree of deterioration of the SCR catalyst is comparatively small, as denoted by the solid line in FIG. 4, the $NO_X$ purification rate of the SCR catalyst tends to be higher when the $O_2$ concentration is higher than when the $O_2$ concentration is lower. If the degree of deterioration of the SCR catalyst is comparatively large, as denoted by the dashed line in FIG. 4, the $NO_X$ purification rate of the SCR catalyst tends to be higher when the $O_2$ concentration is low than when the $O_2$ concentration is high. The tendencies depicted in FIG. 4 can conceivably be ascribed to the reasons below.

Specifically, when the SCR catalyst is exposed to an atmosphere at or above a predetermined deterioration start temperature (for instance about 750° C.) that is higher than the above predetermined threshold value (Tthre), for instance in a case where the particulate filter of the first catalyst casing 3 has undergone a filter regeneration treatment, copper ions ($Cu^+$) turn into an oxide (CuO) (step (d')), without being re-oxidized, as illustrated in FIG. 5, upon contact between the copper ions ($Cu^+$) having hydrogen ions $H^+$ adsorbed thereon with $O_2$ in the exhaust gas, after the reaction in step (c) above has occurred. The oxide (CuO) thus generated remains on the SCR catalyst without reverting to copper ions ($Cu^+$ or $Cu^{2+}$). Then upon addition of the reducing agent through the reducing agent addition valve 5 in a state where the temperature of the SCR catalyst is higher than a predetermined threshold value, oxidation reactions from $NH_3$ to $NO_X$ are elicited through supply of $NH_3$ and $O_2$ to the above oxide (CuO) (step (a')). That is, when $Cu^+$ turns into CuO due to the fact that of the SCR catalyst is exposed to an atmosphere at or above a predetermined deterioration start temperature, reduction reactions of $NO_X$ by $NH_3$ do not occur readily, whereas oxidation reactions from $NH_3$ to $NO_X$ develop readily. In the present example, the greater the amount of oxide (CuO) of copper ions, the greater is the degree of deterioration of the SCR catalyst. The amount of oxide (CuO) of copper ions trends to increase with increasing duration of the exposure of the SCR catalyst to an atmosphere at or above a predetermined deterioration start temperature. In a case where the amount of CuO in the SCR catalyst is larger (in the case where a degree of deterioration of the SCR catalyst is large), when the temperature of the SCR catalyst exceeds a predetermined threshold value (Tthre), the amount of $NH_3$ that reacts with $O_2$ in the exhaust gas in the SCR catalyst increases more readily and accordingly the amount of $NO_X$ generated in the SCR catalyst increases more readily as well, as compared with a case where amount of CuO in the SCR catalyst is smaller (in the case where a degree of deterioration of the SCR catalyst is small). In a case where the degree of deterioration of the SCR catalyst is comparatively large, there increases accordingly the amount of $O_2$ contributing to oxidation reactions from $NH_3$ to $NO_X$ in step (a') of FIG. 4 described above, since the $O_2$ concentration in exhaust gas flowing into the SCR catalyst becomes comparatively high when the amount of fuel added through the fuel addition valve 6 is set to be comparatively small at the time of addition of the reducing agent through the reducing agent addition valve 5 in a state where the temperature of the SCR catalyst is higher than a predetermined threshold value. In that case the amount of $NO_X$ flowing out of the SCR catalyst may increase due to the increase in the generation amount of $NO_X$ derived from $NH_3$, and hence the $NO_X$ purification rate of the SCR catalyst may drop. In a case by contrast where the degree of deterioration of the SCR catalyst is comparatively small, the amount of amount of $O_2$ contributing to re-oxidation (valence recovery) of copper ions ($Cu^+$), having descended to a lower state in step (d) of FIG. 2, becomes insufficient, since the $O_2$ concentration in exhaust gas flowing into the SCR catalyst becomes comparatively low when the amount of fuel added through the fuel addition valve 6 is set to be comparatively large at the time of addition of the reducing agent through the reducing agent addition valve 5 in a state where the temperature of the SCR catalyst is higher than a predetermined threshold value. In that case, the amount of $NO_X$ reduced by copper ions ($Cu^{2+}$) in the reference state may decrease on account of smaller amount of copper ions recovered from the lower state to the reference state, and as a result, the $NO_X$ purification rate of the SCR catalyst may drop. Therefore, in a case where the degree of deterioration of the SCR catalyst is comparatively small, the $NO_X$ purification rate of the SCR catalyst is higher when the $O_2$ concentration is higher than when the $O_2$ concentration is lower, whereas in a case where the degree of deterioration of the SCR catalyst is comparatively large, the $NO_X$ purification rate of the SCR catalyst is higher when the $O_2$ concentration is lower than when the $O_2$ concentration is higher, as in FIG. 4 described above.

In consequence, in the $NH_3$ oxidation suppression control scheme of the present example the ECU 10 is set to adjust the amount of fuel added through the fuel addition valve 6 in accordance with the degree of deterioration of the SCR catalyst, in a case where a reducing agent is to be added through the reducing agent addition valve 5 in a state where the temperature of the SCR catalyst exceeds the predetermined threshold value (Tthre). Specifically, the ECU 10 controls the fuel addition valve 6 in such a manner that the amount of fuel added through the fuel addition valve 6 is smaller in a case where the degree of deterioration of the SCR catalyst is smaller than in a case where the degree of deterioration of the SCR catalyst is larger. As described above, the degree of deterioration of the SCR catalyst is correlated to the time during which the SCR catalyst has been exposed to an atmosphere at or above a predetermined deterioration start temperature. In the present example, therefore, the ECU 10 integrates the time during which the SCR catalyst has been exposed at or above a predetermined deterioration start temperature, over the lapse of time since the SCR catalyst was brand new until the present time, and stores the resulting integrated time in a non-volatile memory such as a backup RAM. The ECU 10 is set to estimate that the degree of deterioration of the SCR catalyst is larger in a case where integrated time is long than in a case where the integrated time is short. In a state where the SCR catalyst is exposed to an atmosphere at or above a predetermined deterioration start temperature, the change from copper ions to CuO occurs more readily in a case where the atmospheric air-fuel ratio in the SCR catalyst is a rich air-fuel ratio, i.e. richer than the theoretical air-fuel ratio as compared with a case where the atmospheric air-fuel ratio in the SCR catalyst is equal to or higher than the theoretical air-fuel ratio. Accordingly, the degree of deterioration of the SCR catalyst may be estimated taking into consideration also the atmospheric air-fuel ratio at the time where the SCR catalyst has been exposed to an atmosphere at or above a predetermined deterioration start temperature. For instance, the degree of deterioration of the SCR catalyst may be estimated to be larger in a case where the integrated value of the time during which the atmospheric air-fuel ratio in the SCR catalyst was a rich air-fuel ratio is long than in a case where the integrated value is short, from within the integrated time during which the SCR catalyst has been exposed to an atmosphere at or above a predetermined deterioration start temperature.

Upon estimation of the degree of deterioration of the SCR catalyst in accordance with the above method, the ECU 10 determines then the amount of fuel to be added through the fuel addition valve 6 per unit time in accordance with the estimated degree of deterioration of the SCR catalyst. At this time, the ECU 10 determines the amount of fuel to be added through the fuel addition valve 6 per unit time in such a manner that the $O_2$ concentration in the exhaust gas flowing into the SCR catalyst is lower in a case where the degree of deterioration of the SCR catalyst is larger than in a case where degree of deterioration of the SCR catalyst is smaller, as illustrated in FIG. 6. The $O_2$ concentration illustrated in FIG. 6 is an $O_2$ concentration deemed to yield the smallest amount of $NO_X$ generated through reaction of $O_2$ in the exhaust gas with $NH_3$ derived from the reducing agent, in the SCR catalyst, in other words, the $O_2$ concentration (hereafter also referred to as "optimal $O_2$ concentration") deemed to afford the highest possible $NO_X$ purification rate of the SCR catalyst in a state where the temperature of the SCR catalyst is higher than a predetermined threshold value. A correlation between degree of deterioration of the SCR and optimal $O_2$ concentration, such as that illustrated in FIG. 6, is worked out beforehand on the basis of results of experiments or simulations, and is stored for instance in the ROM of the ECU 10 in the form of a map or a function expression. The integrated value of the time during which the SCR catalyst has been exposed to an atmosphere at or above a predetermined deterioration start temperature may be used, instead of the degree of deterioration of the SCR catalyst, as the argument in the map or function expression for determining the optimal $O_2$ concentration. The map or function expression in that case may be constructed in such a manner that the optimal $O_2$ concentration is lower in a case where the integrated value of the time during which the SCR catalyst has been exposed to an atmosphere at or above a predetermined deterioration start temperature is larger than in a case where the integrated value is smaller. Once having worked out the optimal $O_2$ concentration on the basis of such a map or function expression, the ECU 10 calculates then a fuel addition amount per unit time as necessary in order to bring the $O_2$ concentration of exhaust gas flowing into the SCR catalyst to the optimal $O_2$ concentration, on the basis of the amount of exhaust gas discharged per unit time from the internal combustion engine 1 and the $O_2$ concentration is a well-known feature exhaust gas. Herein the amount of exhaust gas discharged per unit time from the internal combustion engine 1 can be calculated on the basis of a value measured by the air flow meter 13 and a fuel injection amount. The $O_2$ concentration in the exhaust gas discharged from the internal combustion engine 1 can be calculated on the basis of a value measured by the air-fuel ratio sensor 15.

Once having determined, in accordance with the above method, the amount of fuel to be added through the fuel addition valve 6 per unit time, the ECU 10 determines the timing of adding the fuel through the fuel addition valve 6, on the basis of the timing at which the reducing agent is added through the reducing agent addition valve 5. Herein the ECU 10 determines a fuel addition timing of the fuel addition valve 6 in such a manner that fuel addition through the fuel addition valve 6 starts earlier than the timing of initiation of addition of reducing agent through the reducing agent addition valve 5. That is because it takes some time (transport delay time) for the exhaust gas having had fuel added thereto through the fuel addition valve 6 to reach the addition position of the reducing agent addition valve 5. This transport delay time is shorter in a case where the flow rate of the exhaust gas is higher than in when the flow rate is lower. Therefore, the ECU 10 firstly calculates the transport delay time on the basis of the flow rate of the exhaust gas. Next, the ECU 10 may determine the fuel addition timing of the fuel addition valve 6 in such a manner that fuel addition through the fuel addition valve 6 starts at a timing that precedes, by the above transport delay time, the timing at which there starts the addition of reducing agent through the reducing agent addition valve 5. Upon initiation of fuel addition through the fuel addition valve 6 at the above timing, firstly the exhaust gas containing the added fuel flows into the oxidation catalyst of the first catalyst casing 3. In consequence part of the $O_2$ contained in the exhaust gas is consumed in the oxidation of the added fuel, and the $O_2$ concentration in the exhaust gas drops accordingly. Thereafter, addition of reducing agent through the reducing agent addition valve 5 is initiated at the timing at which the exhaust gas, having had the $O_2$ concentration thereof lowered, reaches the addition position of the reducing agent addition valve 5. As a result, the exhaust gas flowing into the SCR catalyst is a gas containing $NH_3$ derived from the reducing agent added through the reducing agent addition valve 5, and having had the $O_2$ concentration lowered down to the optimal $O_2$ concentration. When such a gas flows into the SCR catalyst, the $O_2$ amount that contributes to oxidation of $NH_3$ mediated by CuO can be reduced, while securing in the SCR catalyst an amount of $O_2$ that contributes to re-oxidation of copper ions ($Cu^+$) having descended to the lower state. As a result, it becomes possible to maximize the $NO_X$ purification rate of the SCR catalyst in a state where the temperature of the SCR catalyst is higher than a predetermined threshold value.

An execution procedure of $NH_3$ oxidation suppression control in the present example will be explained next with reference to FIG. 7. FIG. 7 is a flowchart illustrating a processing routine that is executed by the ECU 10 during execution of $NH_3$ oxidation suppression control. The processing routine is stored beforehand in the ROM of the ECU 10, and is executed repeatedly at predetermined cycles during the operation of the internal combustion engine 1.

In the processing routine of FIG. 7, the ECU 10 firstly acquires the temperature of the SCR catalyst (Tscr), in the process in S101. Specifically, the ECU 10 calculates the temperature of the SCR catalyst (Tscr) on the basis of a value measured by the exhaust gas temperature sensor 9. In a configuration wherein in addition to the above exhaust gas temperature sensor 9, a further exhaust gas temperature sensor is attached also at the exhaust passage 2 between the first catalyst casing 3 and the second catalyst casing 4, the ECU 10 may calculate the temperature of the SCR catalyst (Tscr) on the basis of a difference between values measured by these two exhaust gas temperature sensors.

In the process in S102, the ECU 10 determines whether or not the temperature of the SCR catalyst (Tscr) acquired in the process of S101 is higher than the predetermined threshold value (Tthre). If the temperature of the SCR catalyst (Tscr) is equal to or lower than the predetermined threshold value (Tthre), $NH_3$ oxidation suppression control need not be carried out, and accordingly the ECU 10 terminates execution of the present processing routine. If on the other hand the temperature of the SCR catalyst (Tscr) is higher than the predetermined threshold value (Tthre), it is necessary to perform $NH_3$ oxidation suppression control, and accordingly the ECU 10 executes the process from S103 onwards.

In the process in S103, the ECU 10 estimates the degree of deterioration of the SCR catalyst. As described above, the degree of deterioration of the SCR catalyst is correlated to the temperature history of the SCR catalyst (integrated value of the time during which the SCR catalyst has been exposed to an atmosphere at or above a predetermined deterioration start temperature). In the present example, the ECU 10 integrates the time during which the SCR catalyst has been exposed at or above a predetermined deterioration start temperature, over the lapse of time since the SCR catalyst was brand new until the present time, and stores the resulting integrated time in, for example, a backup RAM in the ECU 10. In the process in S103, accordingly, the ECU 10 may derive the degree of deterioration of the SCR catalyst by accessing a map or function expression, such as that illustrated in FIG. 8, using as the argument the integrated time stored in the backup RAM. FIG. 8 is a map or function expression denoting a correlation between the above integrated time and the degree of deterioration of the SCR catalyst, the map or function expression being constructed so that the degree of deterioration of the SCR catalyst is larger in a case where the integrated time is long than in a case where the integrated time is short. A correlation such as that illustrated in FIG. 8 is worked out beforehand on the basis of for instance results of experiments or simulations.

In the process in S104, the ECU 10 acquires an optimal $O_2$ concentration on the basis of the degree of deterioration of the SCR catalyst estimated in the process in S103. Herein the ECU 10 accesses a map or function expression such as that illustrated in FIG. 6 described above, using as the argument the degree of deterioration of the SCR catalyst having been estimated in the process in S103, to derive an $O_2$ concentration (optimal $O_2$ concentration) that allows raising as much as possible the $NO_X$ purification rate of the SCR catalyst. The optimal $O_2$ concentration thus derived is higher in a case where the degree of deterioration of the SCR catalyst is smaller than in a case where the degree of deterioration is larger.

In the process in S105, the ECU 10 calculates a fuel amount (fuel addition amount) that is to be added per unit time through the reducing agent addition valve 5, on the basis of the optimal $O_2$ concentration acquired in the process in S104. Specifically, the ECU 10 calculates firstly the amount of exhaust gas discharged per unit time from the internal combustion engine 1, on the basis of a value (intake air amount) measured by the air flow meter 13 and a fuel injection amount. The ECU 10 calculates the $O_2$ concentration in exhaust gas discharged from the internal combustion engine 1 on the basis of a value measured by the air-fuel ratio sensor 15. The ECU 10 calculates the fuel addition amount necessary to lower the $O_2$ concentration in the exhaust gas down to the optimal $O_2$ concentration on the basis of the amount of exhaust gas discharged per unit time from the internal combustion engine 1 and the $O_2$ concentration in the exhaust gas.

In the process in S106, the ECU 10 calculates the timing (fuel addition timing) at which fuel addition through the fuel addition valve 6 is to be initiated. Specifically, the ECU 10 firstly calculates the flow rate of exhaust gas on the basis of the engine rotational speed of the internal combustion engine 1 and a value measured by the air flow meter 13. Next, the ECU 10 calculates a time (transport delay time) necessary for exhaust gas to move from the addition position of the fuel addition valve 6 up to the addition position of the reducing agent addition valve 5, on the basis of the flow rate of the exhaust gas and the distance from the addition position of the fuel addition valve 6 up to the addition position of the reducing agent addition valve 5. The ECU 10 then sets, as the fuel addition timing, a timing that precedes, by the transport delay time, the timing at which addition of the reducing agent through the reducing agent addition valve 5 is to be initiated.

In the process in S107, the ECU 10 adds fuel through the fuel addition valve 6 on the basis of the fuel addition amount calculated in the process in S105 and the fuel addition timing calculated in the process in S106. AS a result, it becomes possible to bring the $O_2$ concentration in the exhaust gas flowing into the SCR catalyst to a concentration (optimal $O_2$ concentration) that allows raising as much as possible the $NO_X$ purification rate, for the current degree of deterioration of the SCR catalyst. Specifically, the $O_2$ concentration of exhaust gas flowing into the SCR catalyst can be made comparatively low in a case where the degree of deterioration of the SCR catalyst is comparatively large, whereas the $O_2$ concentration of exhaust gas flowing into the SCR catalyst can be made comparatively high in a case where the degree of deterioration of the SCR catalyst is comparatively small. As a result, the $O_2$ amount contributing to oxidation reactions from $NH_3$ to $NO_X$ by the oxide of copper ions can be reduced in a case where the degree of deterioration of the SCR catalyst is comparatively large, whereas the $O_2$ amount contributing to re-oxidation (valence recovery) of copper ions ($Cu^+$) having descended to a lower state can be secured in a case where the degree of deterioration of the SCR catalyst is comparatively small.

In the present example described above the $NO_X$ purification rate of the SCR catalyst can be maximized in a case where the temperature of the SCR catalyst is higher than a predetermined threshold value.

OTHER EXAMPLES

In the embodiment described above an instance has been explained in which a predetermined threshold value serving as a reference for determining whether $NH_3$ oxidation suppression control is to be performed or not is fixed to a value established beforehand, but the predetermined threshold value may be modified in accordance with the degree of deterioration of the SCR catalyst.

An increase in the amount of copper ions ($Cu^+$) that turn into an oxide (CuO) may give rise, when the degree of deterioration of the SCR catalyst is larger, to the development of oxidation reactions from $NH_3$ to $NO_X$ elicited through the action of CuO at a temperature region that is lower than when the degree of deterioration of the SCR catalyst is smaller (when the amount of CuO is small). Accordingly, establishing a predetermined threshold value taking into consideration the degree of deterioration of the SCR catalyst allows suppressing more reliably oxidation reactions from $NH_3$ to $NO_X$ by CuO, and allows re-oxidation (valence recovery) of copper ions ($Cu^+$) having descended to the lower state to develop more reliably. Specifically, the predetermined threshold value (Tthre) may be set to a comparatively high temperature in a case where the degree of deterioration of the SCR catalyst at the time of addition of reducing agent through the reducing agent addition valve 5 is comparatively small, as illustrated in FIG. 9. When the degree of a deterioration of the SCR catalyst reaches a certain extent, the predetermined threshold value (Tthre) may be set to an increasingly lower temperature as the degree of deterioration increases. As a result, $NH_3$ oxidation suppression control is not executed unless the temperature of the SCR catalyst is a comparatively high temperature, in a case where the degree of deterioration of the SCR catalyst is comparatively small. Specifically, execution of the $NH_3$ oxidation suppression control is curtailed in a state where oxidation reactions from $NH_3$ to $NO_X$ mediated by CuO hardly develop. In consequence there is readily secured the $O_2$ necessary for re-oxidation of copper ions ($Cu^+$) having descended to a lower state. As a result, this allows reoxidation (valence recovery) of copper ions ($Cu^+$) having descended to the lower state to take place more reliably. In a case where the degree of deterioration of the SCR catalyst is comparatively large, $NH_3$ oxidation suppression control is executed also when the temperature of the SCR catalyst becomes lower temperature as the degree of deterioration increases. Therefore, $NH_3$ oxidation suppression control is executed more reliably in a state where oxidation reactions from $NH_3$ to $NO_X$ mediated by CuO can develop, and accordingly the amount of $O_2$ contributing to oxidation reactions from $NH_3$ to $NO_X$ mediated by CuO can be reduced more reliably. It becomes therefore possible to suppress more reliably oxidation reactions from $NH_3$ to $NO_X$ by CuO. A correlation between the degree of deterioration of the SCR and the predetermined threshold value (Tthre), such as that illustrated in FIG. 9, is worked out beforehand on the basis of results of experiments or simulations, and is stored for instance in the ROM of the ECU 10, in the form of a map or a function expression.

An execution procedure of $NH_3$ oxidation suppression control in the present example will be explained next with reference to FIG. 10. FIG. 10 is a flowchart illustrating a processing routine that is executed by the ECU 10 during execution of $NH_3$ oxidation suppression control. In FIG. 10, process steps identical to those of the processing routine illustrated in FIG. 7 described above will be denoted with identical reference symbols.

In the processing routine of FIG. 10, the ECU 10 executes the processes in S201 to S202 prior to execution of the process in S101. Firstly, in the process in S201, the ECU 10 estimates the degree of deterioration of the SCR catalyst. The same method as in the process in S103 in the processing routine illustrated in FIG. 7 described above can be resorted to as the method for estimating the degree of deterioration of the SCR catalyst.

In the process in S202, the ECU 10 sets a predetermined threshold value (Tthre) on the basis of the degree of deterioration of the SCR catalyst estimated in the process in S201. Specifically, the ECU 10 accesses a map or function expression such as that illustrated in FIG. 9 described above, using as the argument the degree of deterioration of the SCR catalyst having been estimated in the process in S201, to derive a predetermined threshold value (Tthre) suitable for the degree of deterioration of the SCR catalyst.

Once execution of the process in S202 is over, the ECU 10 executes sequentially the processes in S101 and S102. In the process in S102 there is used the predetermined threshold value (Tthre) having been derived and set in the process in S202. Upon an affirmative determination in the process in S102, the ECU 10 executes the process in S104 onwards, instead of executing the process in S103.

In the other example described above, modification of the predetermined threshold value (Tthre) depending on the degree of deterioration of the SCR catalyst allows suppressing more reliably oxidation reactions from $NH_3$ to $NO_X$ by CuO, and allows re-oxidation (valence recovery) of copper ions ($Cu^+$) having descended to the lower state to take place more reliably. As a result, the $NO_X$ purification rate of the SCR catalyst can be in increased more reliably.

<Others>

In the embodiment and other example described above, instances have been explained in which an oxidation catalyst and a particulate filter are accommodated in the first catalyst casing, but the present disclosure can also be used in configurations where a $NO_X$ storage reduction (NSR) catalyst alone is accommodated in the first catalyst casing, or a configuration wherein an NSR catalyst and a particulate filter are accommodated in the first catalyst casing. In a configuration where an NSR catalyst is accommodated in the first catalyst casing, the SCR catalyst may possibly be exposed at or above a predetermined deterioration start temperature, during execution of a treatment (S regeneration treatment) for eliminating sulfur poisoning in the NSR catalyst. Therefore, if $NH_3$ oxidation suppression control is executed in accordance with the procedure of the example or other example described above, it becomes possible to minimize drops in the $NO_X$ purification rate in cases where the temperature of the SCR catalyst exceeds a predetermined threshold value, as well as drops in the $NO_X$ purification rate derived from deterioration of the SCR catalyst. In a configuration where an NSR catalyst is accommodated in the first catalyst casing, moreover, part of the added fuel added through the fuel addition valve is consumed in the reduction of $NO_X$ stored in the NSR catalyst, and as a result, the amount of $O_2$ contributing to oxidation of the added fuel readily becomes small. In a configuration where an NSR catalyst alone is accommodated in the first catalyst casing, or in a configuration where an NSR catalyst and a particulate filter are accommodated in the first catalyst casing, it is therefore preferable, in a case where $NH_3$ oxidation suppression control is to be carried out, to establish the amount of fuel added through the fuel addition valve 6 in anticipation of the fuel amount that will be consumed in reduction of $NO_X$ stored in the NSR catalyst, to thereby lower more reliably the $O_2$ concentration in the exhaust gas down to the optimal $O_2$ concentration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust gas purification apparatus for an internal combustion engine, comprising:
    a selective catalytic reduction catalyst disposed in an exhaust passage of the internal combustion engine, and equipped with transition metal ions for reducing $NO_X$ in exhaust gas by using $NH_3$ as a reducing agent;
    a reducing agent addition valve disposed in the exhaust passage, upstream of the selective catalytic reduction catalyst, for adding a reducing agent, which is $NH_3$ or a precursor of $NH_3$, into the exhaust gas;
    an oxidation catalyst disposed in the exhaust passage, upstream of the reducing agent addition valve;
    a fuel addition valve disposed in the exhaust passage, upstream of the oxidation catalyst, for adding fuel into the exhaust gas; and
    a controller comprising at least one processor, and configured to add fuel into the exhaust gas through the fuel addition valve, in a case where the reducing agent is added to the exhaust gas through the reducing agent addition valve in a state where the temperature of the selective catalytic reduction catalyst is higher than a predetermined threshold value,
    wherein the controller further configured to:
    estimate a degree of deterioration of the selective catalytic reduction catalyst; and
    control the fuel addition valve so that the amount of fuel added through the fuel addition valve is smaller in a case where the degree of deterioration of the selective catalytic reduction catalyst is smaller than in a case where the degree of deterioration is larger.

2. The exhaust gas purification apparatus for an internal combustion engine according to claim 1, wherein
the controller further configured to:
set the predetermined threshold value to a temperature that is lower in a case where the degree of deterioration of the selective catalytic reduction catalyst is larger than in a case where the degree of deterioration is smaller.

* * * * *